W. B. BISHOP.
MACHINE FOR SOLDERING CAN CAPS.

No. 109,577. Patented Nov. 29, 1870.

Witnesses:
A. W. Almquist
L. S. Mabee

Inventor
W. B. Bishop
per Munn & Co.
Attorneys

UNITED STATES PATENT OFFICE.

WILLIAM B. BISHOP, OF BROOKLYN, NEW YORK.

IMPROVEMENT IN MACHINES FOR SOLDERING CAN-CAPS.

Specification forming part of Letters Patent No. 109,577, dated November 29, 1870.

*To all whom it may concern:*

Be it known that I, WILLIAM B. BISHOP, of Brooklyn, in the county of Kings and State of New York, have invented a new and useful Improvement in Machines for Soldering Can-Caps; and I do hereby declare that the following is a full, clear, and exact description thereof, which will enable others skilled in the art to make and use the same, reference being had to the accompanying drawings, forming part of this specification, in which—

Figure 1:
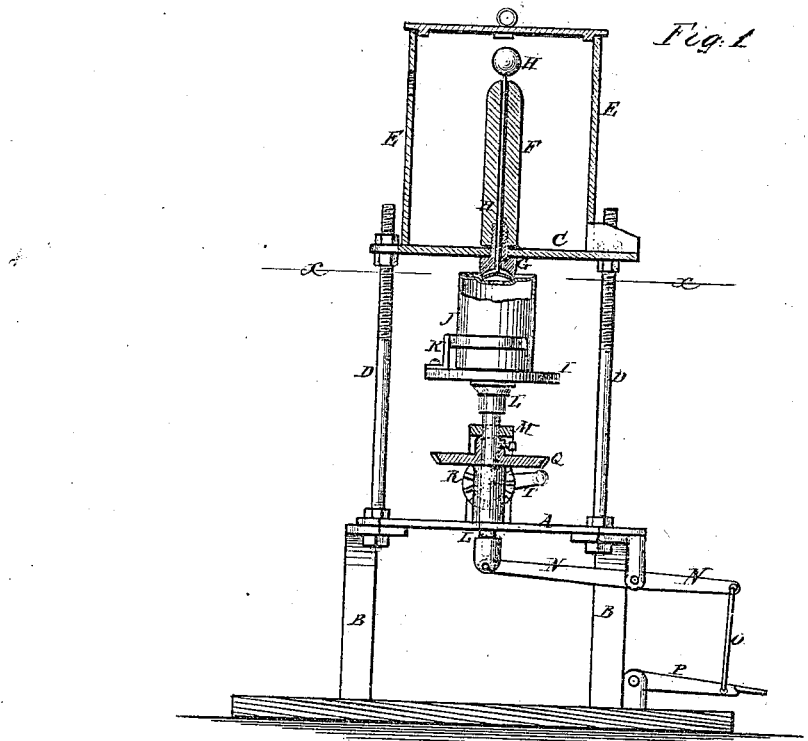
Figure 2:
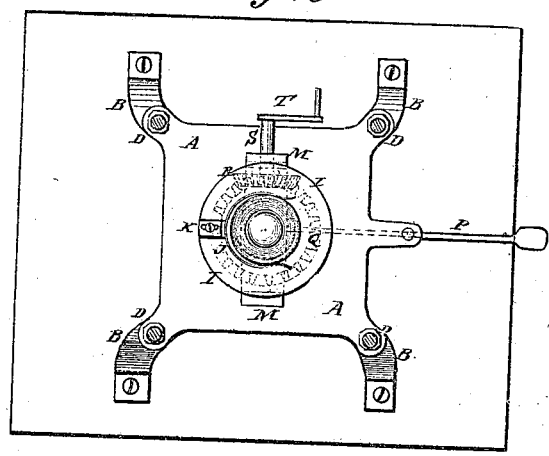

Figure 1 is a side view of my improved machine, partly in section, to show the construction. Fig. 2 is a horizontal section of the same, taken through the line $x$ $x$, Fig. 1.

Similar letters of reference indicate corresponding parts.

My invention has for its object to furnish a simple, convenient, and effective machine for soldering caps upon sheet-metal cans; and it consists in the construction and combination of various parts of the machine, as hereinafter more fully described.

A is the lower platform of the machine, which is securely attached to and supported by legs B, of such a length as to raise the machine to a convenient height.

C is the upper platform, which is connected to the platform A and supported by the rods D, which have screw-threads cut upon one or both ends to receive nuts, which are screwed upon the said rods, one above and one below each platform, as shown in Fig. 1. This construction enables the two platforms to be adjusted at a greater or less distance apart, according to the height of the cans to be soldered.

E is the furnace, in which the fire is formed to heat the soldering-tool, and which is provided with a detachable cover, and with openings to admit the air to support combustion and for the escape of the smoke and other products of combustion.

F is the heater, which is a bar of cast-iron or other suitable material, placed vertically in the center of the furnace E, with its lower end resting upon the center of the platform C. The heater F is connected with the soldering-iron G by a screw, which passes through a hole in the center of the platform C, and which is formed upon either the heater F or soldering-tool G, and screws into the other of said parts, so that the soldering-tool G may be kept hot by heat conducted to it from the heater F. The soldering-tool G may be made of copper, wrought-iron, cast-iron, or other suitable material, and its face is concaved, to receive the cap to be soldered, and to give a ring shape to its edge that comes in contact with the solder around the edge of the cap. The cap is held in place upon the can while being soldered by the rod H, which passes down through the heater F and soldering-tool G, so that its lower end rests upon the said cap. The upper end of the rod H is weighted, to enable it to hold the cap securely in place while being soldered.

I is the table, upon which the can is set to be operated upon, where it is secured in place by the bar J, which is curved to receive the can between its arms, where it is held by the elasticity of the said arms, the ends of said arms being curved outward slightly to allow the can to be conveniently forced into place between them. The middle part of the elastic or spring bar J is attached to the upper end of the support K, the lower end of which is secured to the table I, near one edge, by a screw, which passes through a slot in the lower end of the said support K and screws into the said table I, as shown in Figs. 1 and 2, so that the position of the said bar J may be adjusted according to the size of the can. The table I is made circular in form, and is securely attached to the upper end of the vertical shaft L, which passes down through and revolves in the lower platform, A, and in a support, M, attached to said platform A in such a way that the said shaft may have a vertical movement through its bearings. The lower end of the shaft L rests and revolves in a step pivoted to the end of the lever N, which is pivoted to a support attached to the platform A, and to the outer end of which is pivoted the upper end of the connecting-rod O, the lower end of which is pivoted to the treadle P, the inner end of which is pivoted to the floor, or to some suitable support, and the outer end of which projects into such a position that it may be conveniently reached and operated by the operator with his foot to raise the can to the soldering-tool.

To the shaft L is attached a bevel-gear wheel, Q, the teeth of which mesh into the teeth of the bevel-gear wheel R, attached to the shaft S, which revolves in bearings attached to the platform A, and to the end of which is attached a crank, T, by means of which the vertical shaft L is revolved, the wheel Q being connected with the shaft L in such a way as to carry the said shaft L with it in its revolution, while allowing the shaft to have a free vertical movement.

If desired, several sets of tables and soldering-tools may be connected with the same crank-shaft, so that a number of can-caps may be soldered at the same operation.

Having thus described my invention, I claim as new and desire to secure by Letters Patent—

1. The ring or cup shaped soldering-tool G for soldering the caps upon cans, substantially as herein shown and described.

2. The revolving table I, having also a vertical movement, in combination with the ring or cup shaped soldering-tool G, substantially as herein shown and described, and for the purpose set forth.

3. The combination of the adjustable elastic holder J K with the revolving table I, substantially as herein shown and described, and for the purpose set forth.

4. An improved machine for soldering can-caps, formed by the combination of the platform A, feet B, adjustable platform C, adjusting and supporting rods D, furnace E, heater F, ring or cup shaped soldering-tool G, weighted holding-rod H, table I, adjustable holder J K, shaft L, lever N, treadle P, gear-wheels Q and R, shaft S, and crank T, with each other, substantially as herein shown and described, and for the purpose set forth.

The above specification of my invention signed by me this 25th day of July, 1870.

WILLIAM B. BISHOP.

Witnesses:
 JAMES T. GRAHAM,
 T. B. MOSHER.